US008510201B2

(12) United States Patent
Finfrock et al.

(10) Patent No.: US 8,510,201 B2
(45) Date of Patent: *Aug. 13, 2013

(54) COMPUTER MANAGED RETIREMENT FUND AND METHOD FOR GENERATING INCREASED REVENUE STREAM

(76) Inventors: Dale B. Finfrock, Palm Beach, FL (US); A. Rene Dervaes, Jr., Yulee, FL (US); Robert S. Dervaes, legal representative, Yulee, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,928

(22) Filed: Apr. 16, 2012

(65) Prior Publication Data

US 2012/0215722 A1     Aug. 23, 2012

Related U.S. Application Data

(63) Continuation of application No. 12/838,777, filed on Jul. 19, 2010, now Pat. No. 8,160,948, which is a continuation-in-part of application No. 12/108,131, filed on Apr. 23, 2008, now abandoned.

(30) Foreign Application Priority Data

Apr. 28, 2011 (WO) ................ PCT/US11/34233

(51) Int. Cl.
    *G06Q 10/06* (2012.01)
(52) U.S. Cl.
    USPC .................................. 705/36 R; 705/35
(58) Field of Classification Search
    None
    See application file for complete search history.

(56) References Cited

U.S. PATENT DOCUMENTS

| 4,642,768 | A | 2/1987 | Roberts |
| 4,722,055 | A | 1/1988 | Roberts |
| 4,752,877 | A | 6/1988 | Roberts |
| 5,592,379 | A | 1/1997 | Finfrock |
| 6,061,661 | A * | 5/2000 | Hagan ............... 705/36 R |
| 6,338,047 | B1 | 1/2002 | Wallman |
| 2004/0177021 | A1 * | 9/2004 | Carlson et al. ........... 705/36 |
| 2009/0099979 | A1 * | 4/2009 | Raghavan et al. ....... 705/36 R |
| 2010/0153296 | A1 * | 6/2010 | Volpert et al. ........... 705/36 R |

OTHER PUBLICATIONS

Ronald Sages et al., Considerations in choosing a common investment alternative, Trusts & Estates, New York: Mar. 1994, vol. 133, iss. 3, p. 45, 7 pgs.*
John Duncan, Investment pooling vehicles for private trust and banking clients, Trust Letter, Washington: Jul. 1997, iss. 380, p. 9, 4 pgs.*
Scahill, Patricia et al., Phased Retirement for Defined Benefit Plan Participants, Journal of Actuarial Practice, vol. 11, 2004.*
Ronald Sages et al., Consideration in choosing a common investment alternative, Trusts & Estates, New York: Mar. 1994, vol. 133, iss. 3, p. 45, 7 pgs.

* cited by examiner

*Primary Examiner* — Rajesh Khattar
*Assistant Examiner* — Carol See
(74) *Attorney, Agent, or Firm* — Malin Haley DiMaggio & Bowen, P.A.

(57) ABSTRACT

A retirement fund program managed by computer software requiring an initial fixed investment and producing an ever increasing revenue stream to a group of participant investors organized by life expectancy and grouped into an investment partnership. A financial portfolio is created from the monies invested by each investor and is used to manage high quality securities to generate income for the partnership. Periodically, the surviving members of the partnership are entitled to receive the revenue generated from the portfolio, which statistically will increase as fewer participant investors survive. The partnership can purchase term life insurance on each participant investor, so that the initial investment can be returned to the estate of a participant investor if the participant investor becomes deceased during the program. Upon termination of the program, all remaining assets will be distributed pro rata among the living participant investors of the investment partnership.

6 Claims, 5 Drawing Sheets

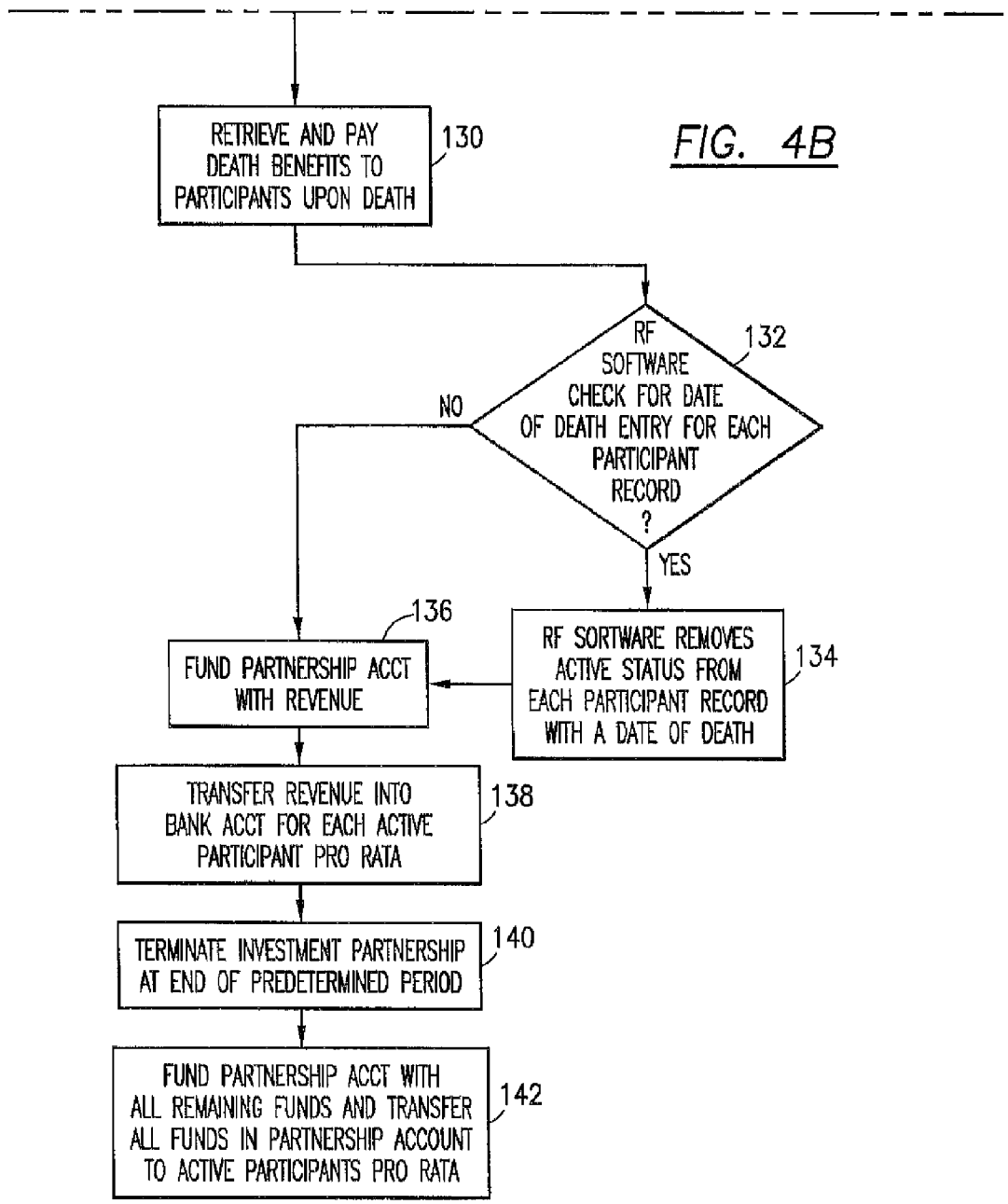

COMPUTER MANAGED RETIREMENT FUND AND METHOD FOR GENERATING INCREASED REVENUE STREAM

This application is a continuation of utility application Ser. No. 12/838,777.

BACKGROUND OF THE INVENTION

1. Field of the Invention

This invention relates to a managed retirement fund program in the field of financial securities to generate a stream of income for a pool of seniors as they grow older and, in particular, to a computer software administrated retirement fund program that provides an increasing stream of annual revenue to the survivors in the pool as the investors grow older.

2. Description of Related Art

The United States is experiencing a demographic increase in people reaching the customary retirement age of 65 years old. The group has been named "Baby Boomers." A chief concern of each senior citizen is to maintain a stream of retirement income until death. For this reason a number of financial programs are now available specifically directed to senior citizens for the purpose of providing steady income during retirement. Steady income throughout retirement years helps prevent retired individuals from becoming financial burdens upon their children should they outlive their assets. However, if retirees rely upon fixed incomes, the possibility exists that inflation will depreciate the fixed incomes to a level that may quickly consume their net worth. In an effort to forego such a possibility, numerous programs have been developed to insure the retirees' continued incomes.

Conventional passbook saving accounts, certificate of deposits, or bond purchases maintained by an individual provide a predictable flow of income but do not provide a procedure for maintaining pace with inflation. Similarly, numerous annuity offerings are made available providing the recipient the right to receive fixed periodic payments either for life or for a term of years. Annuities include bonds, trust contingent, deferred group, joint, life, private, refund, retirement, straight, and variable to name a few. The payments represent a partial return of capital and return of interest. U.S. Pat. No. 5,592,379 issued on Jan. 7, 1997 describes a computer system for managing U.S. treasury bonds for enhancing payments to survivors.

Insurance is a program generally made operative by death providing the beneficiary with proceeds at death. For a couple in retirement, a spouse typically collects the insurance proceeds upon the death of the spouse. Insurance can also be used to provide protection for uncertain costs. U.S. Pat. Nos. 4,642,768, 4,722,055 and 4,752,877 issued to Roberts disclose methods and apparatus for funding future liability of uncertain costs. The program allows the investor to fund a fairly certain future cost such as a child's college education as well as estimate the expected cost of the liability, when the liability will incur, and the amount of insurance necessary to cover the liability.

What cannot be predicted is how long an individual will live. Given a group of men all born in the same month and year of certain demographic criteria such as Jan. 1, 1945, if the median average lifespan is 77 years, some will die younger and some may live into their 90's. The computer managed retirement fund is to provide a dependable income stream quarterly to those fortunate enough to live well past the median average life span. Therefore, what is needed is a process and system for providing a retired investor with a predictable income as well as a device for providing the individual with a statistical method of increasing that income during the remaining lifetime of the individual.

SUMMARY OF THE INVENTION

A computer managed retirement fund program that provides an increasing stream of revenue for surviving individual investors as the investor grows older. The computer managed retirement fund program's purpose is to provide a source of income to meet the increasing expenses of those participant investors who live extended lives. This is accomplished by terminating the dividend payments from an aggregate investment in an investment portfolio to any participant investor who dies in the interim, thereby increasing the amount of dividend funds available for distribution to surviving participant investors. The principals of the retirement fund program are individual investors aggregated into an investor pool. In a preferred embodiment, the retirement fund program is administrated using one or more integrated computer software programs designed to track and manage the retirement fund program's participants and payments. The software program is operated from a computing device capable of running the executable program.

To insure that there are sufficient participant investors in a particular pool for there to be sufficient variation from the statistical life expectancy, no pool is formed with fewer than one hundred participants, although a pool could be established with any number of participants. The identity of the participants is not disclosed to the other participants. The computer software assures the investor pool comprises only individuals that are selected by age, year of birth and gender to have a sufficiently similar median or average statistical life expectancies.

The process of selecting of investors of the same life expectancy statistics can also be automated by the computer software. Each potential participant investor has contact, gender, age, and financial information entered into the software program. The software program can then automatically group the investors into different pools based on average or median statistics life expectancy and insure the anonymity of the participant investors.

Once a pool of investors is formed, an investment partnership is formed and an investment partnership bank account is opened. Each participant investor is a partner in the investment partnership and pays a fixed and equal investment to the investment partnership bank account. The investment partnership is established for a fixed predetermined period of time, such as twenty-five years, and is tracked through the software program. For example, if the pool is made up of 60 year old men and the total investment period is twenty-five years, the software program will be set up to track the investment partnership until the living participant investors from that pool reach the age of 85 years old. In the alternative, the investment partnership and the software program can be set to run until a certain percentage of the participant investors remain alive (i.e. 5% or 10%). While twenty-five years is a typical time period, the investment partnership can be set for a longer period, and can also be extendable by agreement of the living participant investors.

An investment portfolio is then formed, with the investment partnership as the owner and funds from the investment partnership bank account being used to provide the initial funds. These investment portfolio funds are used to invest in high quality debt securities. The high quality debt securities will be posted as collateral to invest in one of many leveraged Financial Return/Alpha engines. The Return/Alpha engine will then provide the dividend income in the electronic bank account for payment back to the participant investors electronically to participate electronic bank accounts typically on a quarterly basis for those participant investors that are alive when the dividends are paid.

The investment partnership may acquire term life insurance for each participant investor in the amount of the face value of the original participant investor's funding. Thus, if each participant investor pays, for example, $250,000.00 into the investment partnership, the teen life insurance policy on that particular individual participant investor will be in the face value amount of 250,000.00. The beneficiary of the policy is the investment partnership and the insured is the participant investor. Premium payments on the ten term insurance policy of each initial investor are paid by the investment partnership with funds from the investment partnership bank account. In some instances, the premium would be paid by the participant investor.

The dividends or return of monies on the portfolio are distributed electronically by the computer software pro rata to all current living participant investors in the investment partnership quarterly or per annum. In the event of a death of one of the participant investors, the term life insurance will mature and the participant investor's interest in the investment partnership will terminate. Thus, the estate of the participant investor will receive back the initial investment paid at the beginning of the retirement fund program. Consequently, the heirs will get the benefit of the initial investment return of each deceased participant investor.

The investment portfolio is initially set up for a fixed period of years or until a preset percentage of participating investors remain alive. When the investment portfolio reaches the end of the fixed time period, such as twenty-five or thirty years, or reaches the preset percentage of living participants, such as 5% or 10%, the termination of the investment portfolio and liquidation of its assets will be initiated by computer software. The remaining assets of the investment portfolio will be returned to the investment partnership bank account, where they will be distributed by the computer software on a pro rata basis to the remaining living participant investors to their bank accounts.

In an alternate embodiment, if an participant investor should die before the termination of the investment partnership portfolio, in lieu of term life insurance being paid on each participant investor, the specific participant investor's investment initially made by the participant investor shall be returned by the computer software to the heirs or the estate or an assignee of the original participant investor at the time the investment partnership portfolio is terminated at the end of the fixed period of years. In this particular embodiment, thus, the original investment shall be returned to the participant investor, if alive, or the participant investors' estate or heirs if the participant is not living at the end of the investment partnership.

In another alternate embodiment, if a particular participant investor, while alive, experiences an unusual dire financial circumstance, the participant investor may request from the investment partnership portfolio to withdraw and the investor will receive electronically the participant investor's initial investment back with a penalty generated by the computer software paid to the investment portfolio for tracking or withdrawing the participant investor's original investment.

The computer managed retirement fund and method provided herein for generating a stream of income for retirees who survive beyond the median life expectancy thus includes the ability for either sharing the final amount of money at the end of a fixed term such as twenty-five years by all then living participating investors while each of the deceased initial investors' estates receive their monies back through term life insurance benefits upon death or return of the share at the end of the twenty-five year period to the estate of the deceased participant investor.

Participant investors who survive their fellow participants have the potential for sharing in an increased share of the portfolio's interest and increasing annual revenue stream. In the event all participant investors in a particular investment partnership pool should die before termination period of the investment partnership, the net proceeds are distributed to the estate, heirs or assignees of the original investors. The investment of unit holders principal is not affected by death, for upon liquidation of the fund, each investor or his estate or designate is expected to receive an amount more or less equal to his or her original investment.

Accordingly, the computer managed retirement fund program's objective is to provide a source of income to meet the increasing expenses of those participant investors who live extended lives. This objective is met by terminating the dividend payments provided by the computer managed investment portfolio to any participant investor who dies in the interim, thereby increasing the amount of dividend funds available for distribution to surviving participant investors.

Revenue from the investment portfolio is allocated pro rata periodically to the living pool of participant investors who make up the investment partnership. Annual dividends or lesser period, such as quarterly dividends, can be electronically paid to the living participant investors. Upon death of a participant investor, that person's ownership interest in the investment partnership is terminated.

Since only those participants who are living will be entitled to participate in dividends, the interest allocated to each participant investor will be divided among a smaller and smaller number of participants (statistically) as time goes on, and the revenue stream annually payable to surviving participant investors may be expected to increase.

In the event all participant investors in a pool die before the termination period of the investment partnership, the portfolio assets will be sold and all proceeds distributed to the estates, heirs and assignees of the initial participant investors pro rata.

The investment portfolio that is maintained by the investment partnership as referenced above is essentially invested in high quality securities. In one embodiment, the investment portfolio could post a portion of each purchase of quality securities as collateral and then purchase one of a number of financial return engines. These assets collectively make up the "portfolio." However, it is certainly within the scope of this invention that there can be a number of broad based underlying assets for the investment portfolio that could include bonds, stocks, options, funds including mutual funds, tracker, ETFs, notes, mortgages, REITS, real estate, commodities, or one of a number of financial industry Alpha/Return Engines. The underlying assets could also include taxable and tax-free municipal bonds or similar instruments.

In view of the foregoing, it is an objective of the computer managed retirement fund program to provide a method for generating increased revenue to participants from the revenue gained from pooled high quality securities to the remaining living participants to ensure monthly income to retirees who live well beyond the average life span.

Another objective of the computer managed retirement fund program is to provide a system and computer generated method for administering a program to senior citizens utilizing income producing high quality securities, jointly pooled and singularly administered to ensure monthly income to the survivors.

Another objective of the computer managed retirement fund program is to increase annual income for retirees whose benefit is derived upon living, the income derived therefrom depending upon the participant's life expectancy in respect to co-participants during the interest bearing years of high quality securities.

In accordance with these and other objects which will become apparent hereinafter, the instant invention will now be described with particular reference to the accompanying drawings.

BRIEF DESCRIPTION OF THE DRAWINGS

FIGS. 4A and 4B are a two sheet flow chart showing the specific computer generated method used to operate the computer managed retirement fund through the administrating computer software.

DETAILED DESCRIPTION OF THE INVENTION

Figure 1:
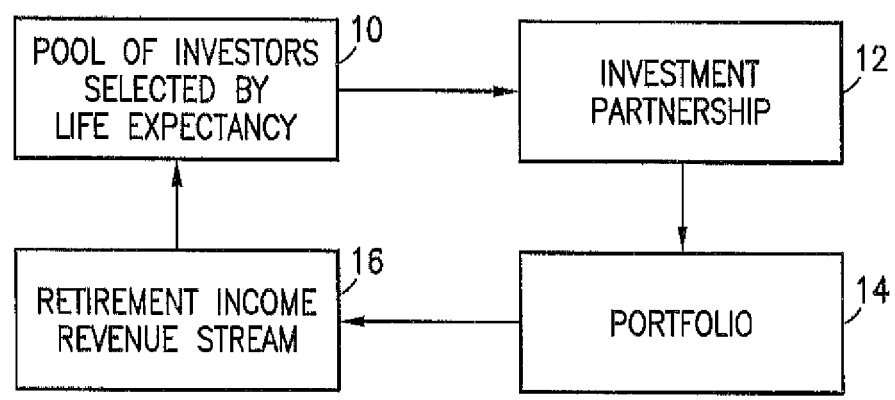
FIG. 1 is a block diagram showing the organizational elements of the computer managed retirement fund.

Referring now to the drawings and, in particular, FIG. 1, primary elements of the retirement fund program are shown. The retirement fund program is organized with a starting point of selecting a pool of investors 10 grouped by life expectancy. The pool of investors 10 would be people that demographically have substantially the same median life expectancy. For example, at the same age, men will statistically have a different median life expectancy than women. Therefore, one pool of investors would be selected for men, particularly born in the same year group, and a different pool of investors could be made up of women born in the same year group for life expectancy purposes. For example, a pool could be made up of at least a minimum of one hundred men, each sixty years of age based on certain birth dates when the pool is established. Likewise, a different pool could be made up of at least one hundred women each being sixty years of age and born in the same year. In the selection of investors, median or average life expectancy is very important to the proper operation of the entire investment partnership, which would be established for a fixed number of years such as twenty-five or thirty years. However, a pool could easily be made up of both women and men, using women of different ages than the men to mathematically correct for the statistical difference in the life expectancy of women over men. One pool could include a group of women of a particular age that is statistically equal in statistical life expectancy to a group of men, where the men would have a lower age but the same life expectancy as the age group of the women. Therefore, the pool does not have to be to one particular gender. As shown in FIG. 1, the pool of investors 10, once selected, are then used to form an investment partnership 12. The investment partnership 12 would require a fixed payment or initial investment by each investor that has been selected into the pool. For example, one hundred investors could make up the pool and each investor would be responsible for contributing $250,000.00 initial investment into the investment partnership. That would establish $25,000,000.00 fund for the investment partnership.

The investment partnership 12 then establishes a portfolio 14 using a large portion of the initial funding by the investors that form the investment partnership. The portfolio would be used to invest in high quality securities. With the retirement fund model shown in FIG. 1, the revenue or dividends from the high quality securities that establish the portfolio 14 produce a retirement income revenue stream shown at 16 that is paid back to the investors at least annually and may be paid even more often such as quarterly to those investors who remain alive during the investment pay period.

In one embodiment, the portfolio 14 in FIG. 1 can be established through the purchase by the investment partnership of quality securities with the initial investment of the participants in the investment partnership. The quality securities are then used as collateral to purchase one of a number of financial return/alpha engines. However, in selection of the particular securities in the portfolio, the portfolio can be quite diverse as is discussed below.

The goal of the retirement fund program is to provide security to the surviving investor for the duration of the program.

Figure 2:
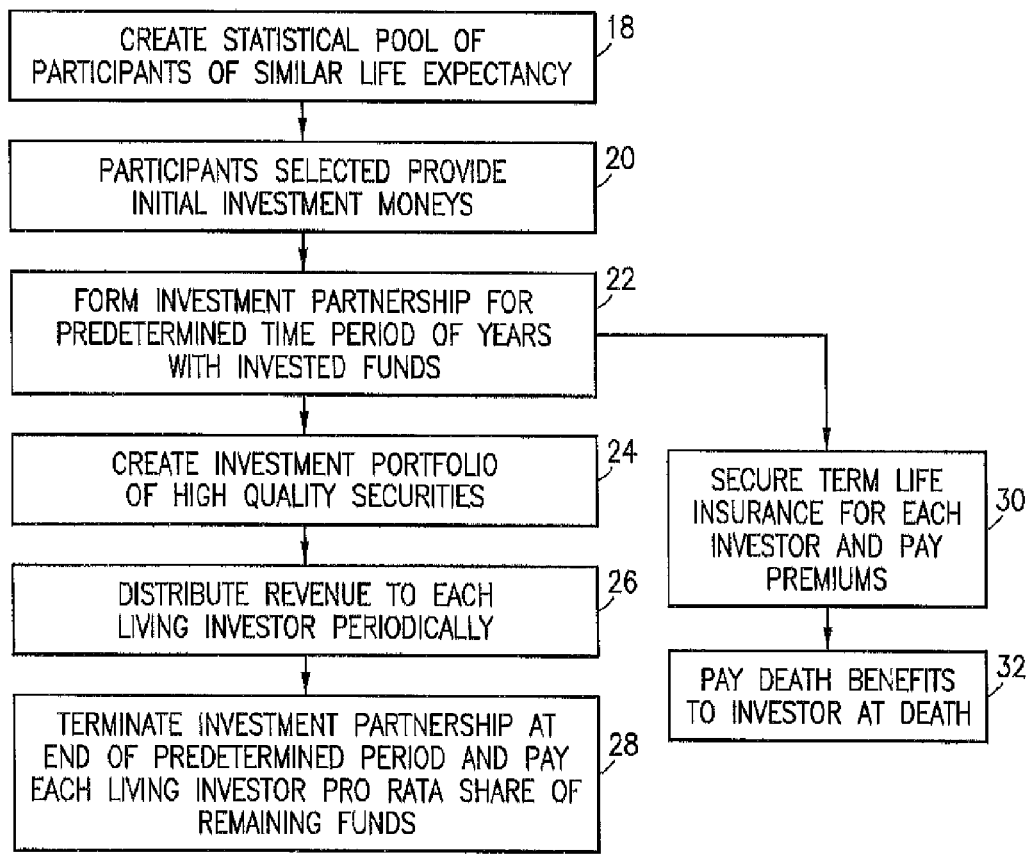
FIG. 2 is a flow chart showing the general steps taken in operating the computer managed retirement fund.

Referring now to FIG. 2, the general operation of one retirement fund process is shown to establish the revenue stream necessary to fund the retirement of the remaining living participants as time passes.

The first step 18 is to create a pool of participants of similar statistical median or average life expectancy. The pool of persons should be large enough to statistically provide a realistic spectrum of investment people that will reach different ages. As discussed above, one method of selecting a pool of individuals of similar median life expectancy would be to pick individuals by gender of a specific age group or birth year to establish a pool of participants. The pool of participants as shown in step 18 would then contribute a specific fixed amount of monies for the initial investment monies from each participant as shown in step 20. The participant and the money are then used to form an investment partnership 22 that has typically a fixed time period of years with the invested funds. In one example, the fixed period of years could be for twenty-five years or thirty years. So, if the statistical pool is comprised of individuals or participants that are sixty year old males and the investment partnership is for twenty-five years or thirty years, then the life span of people participating in the investment partnership could be from the year sixty years old to eighty-five years old. As an example, a pool of 100 investors would invest $250,000.00 each into the investment partnership for a term of twenty-five years.

These funds shown in step 24 would be used to create the investment portfolio and could be invested in the high quality debt securities. The high quality debt securities would be posted as collateral to invest in one of a number of financial return engines. This relates to step 24 in FIG. 2.

The investment partnership acquires term life insurance for each of the investors as shown in step 30 in the amount of the original investment from each participant. The owner and estate of the term life insurance policy would be the insured, who is a participant investor in the investment partnership, or an irrevocable life insurance trust set up by the insured. The premium payments for the term life insurance will be paid by the investment partnership on behalf of each participant investor. Term life insurance could also be an option, with the cost deducted from those investors opting for reducing their yield.

As shown in step 26, the portfolio revenues will be used to distribute interest or return on the portfolio pro rata to all the current investors in the fund that are living. Typically, the distribution would be at least annually and preferably quarterly to each of the participant investors that are alive.

As shown at step 32 in FIG. 2, in the event of a death of a participant investor, the respective term insurance will mature and the participant investor's interest in the investment partnership will terminate. Note that the estate of the deceased participant investor will receive an amount from the term life insurance that is approximately equal to the participant investor's initial, original investment.

As shown in step 28 in FIG. 2, at the termination of the investment partnership at the end of the fixed period of time such as twenty-five years or thirty years, all the assets that remain in the investment partnership would be liquidated and distributed on a pro rata basis to the remaining living participant investors.

It should be noted that as the investment partnership years pass, statistically there will be fewer and fewer remaining living participant investors such that the remaining living participant investors will be entitled to receive increasing amounts of annual revenue from the portfolio due to the reduced numbers of people that are participating. The result is that the longer a participant lives in this retirement fund, statistically on each year of life, the participant's revenue stream should increase. This retirement fund, thus, can greatly increase the revenue stream based on living longer which is of great concern to all retired people so that they do not outlive their financial resources or are not reduced in income based on inflation. Thus, the retirement fund and method described herein is a highly secure investment based on those who live the longest so that they do not run out of money.

Figure 3:
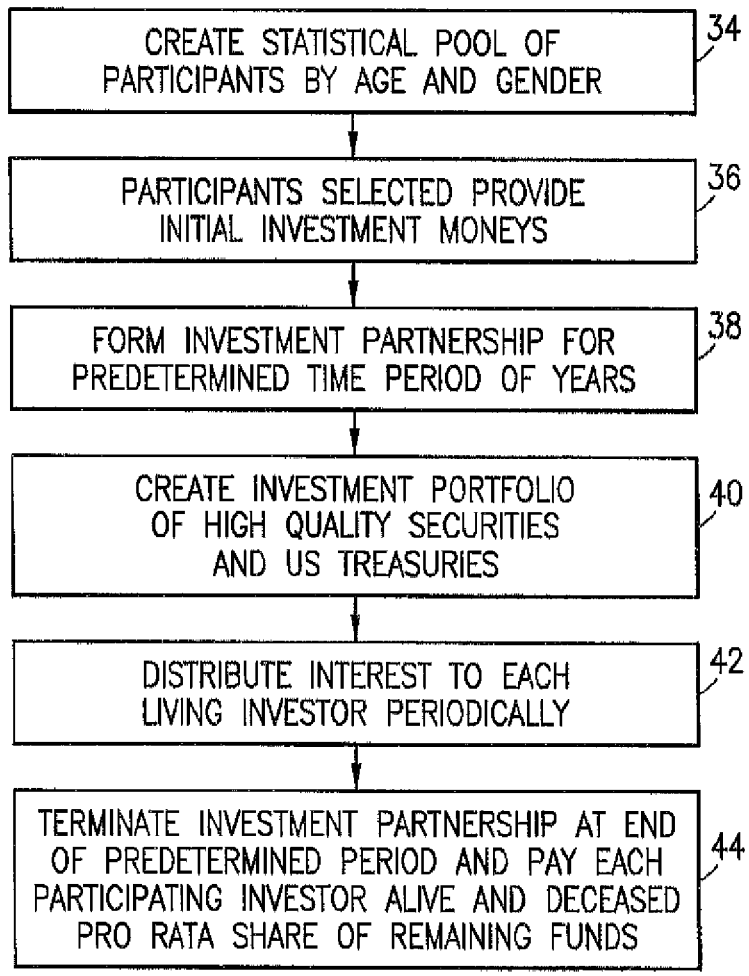
FIG. 3 is a flow chart of an alternate embodiment of the computer managed retirement fund and method.

Referring now to FIG. 3, an alternate embodiment of the retirement fund shown in FIG. 2 is provided. As in the previous embodiment, a pool of statistical participants is created based on median life expectancy as shown in step 34 of FIG. 3 by age and gender. At least one hundred participants will be necessary to establish a pool.

In step 36, the selected participants enter into an investment partnership and are required to individually fund the investment partnership by providing a fixed amount of money to the investment partnership.

The investment partnership that is formed in step 38 in FIG. 3 is established for a fixed time period such as twenty-five or thirty years which is typically based on the age of the pool of participants and their median life expectancies, understanding the fact that statistically, a certain number will live well beyond that life expectancy and a certain number will not live as long as that life expectancy.

The investment partnership will then create a portfolio of high quality securities to generate revenue in the portfolio for the retirement income of the living participants.

In the embodiment shown in FIG. 3, the investment partnership does not purchase term life insurance for each of the investors.

As the investment partnership proceeds from year to year and participant investors become deceased, the deceased participant investor and his or her estate do not continue to receive periodic revenues from the portfolio. However, the portfolio does distribute, as shown in step 42, revenue or interest to each living participant investor periodically such as annually or preferable quarterly each year of the investment partnership. In this embodiment, at the conclusion of the fixed time period for which the investment partnership is established, each living participant as well as the estate or heirs of each dead participant are distributed a pro rata share of the liquidated assets that were in the portfolio at the conclusion of said fixed time period.

Figure 4A:
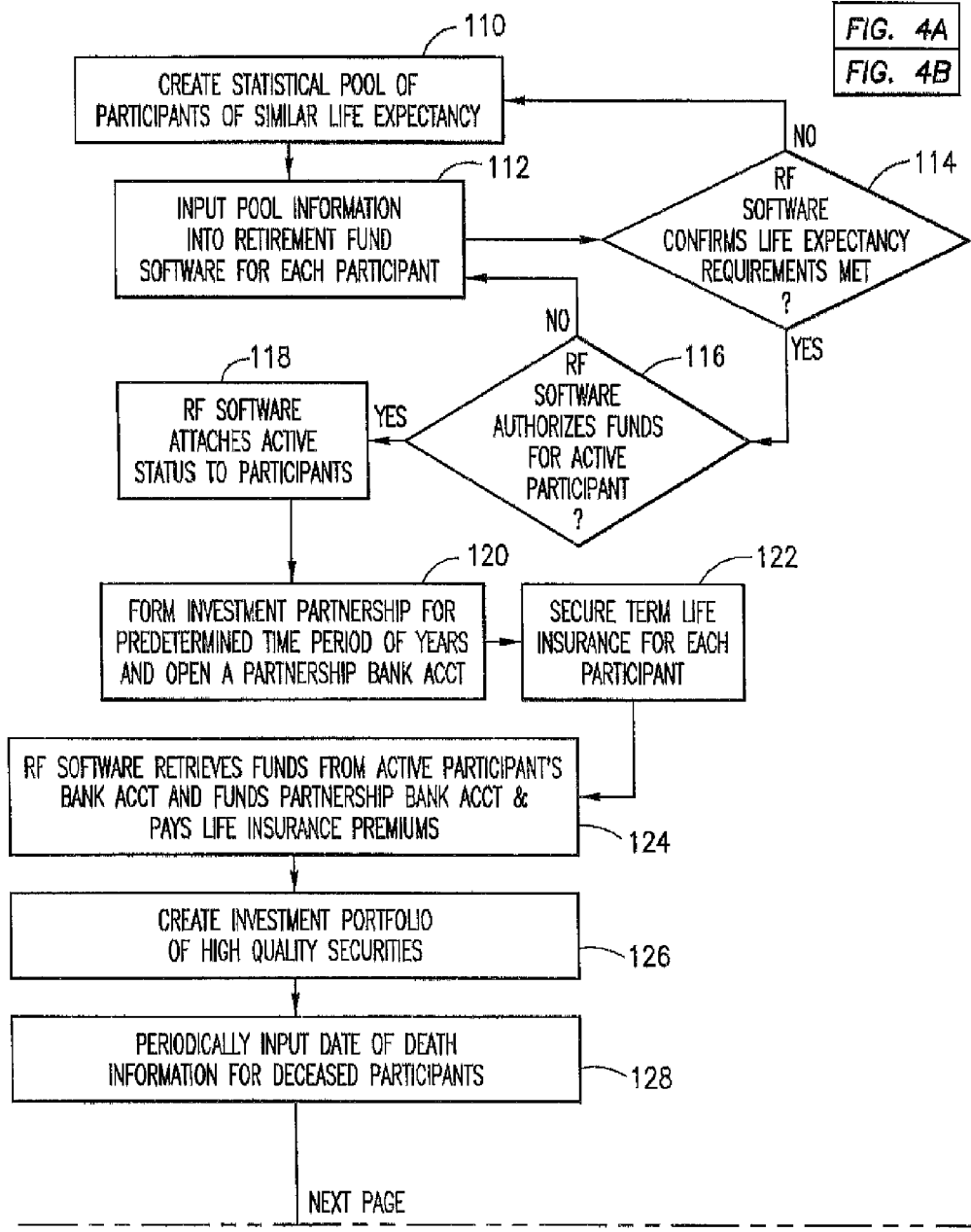

Referring now to FIG. 4, the retirement fund program's implementation on a computer is detailed. This implementation utilizes and is defined by a computer software program that can integrate all of the required steps and components to provide a failsafe and secure operation. The retirement fund program ("rfp") software is a computer software program that is embodied within a computer readable medium and that is operable and executable via a computer. The rfp software requires a connection to the Internet for full functionality.

The rfp software first step 110 is to identify a pool of potential participants of similar median life expectancy. This pool of potential participants can be input from a database or compiled from information made available to the rfp software. For each potential participant selected, pool information must be input by a pool administrator into the rfp software 112 if it is not already available to the rfp software. The rfp software uses the pool information to create a unique virtual record in which the rfp software stores each potential participant's information in a database. Pool information includes the individual's name, contact information, gender, date of birth, and banking information. The minimum required banking information is a routing number and an account number, which are necessary to facility the electronic transfers of funds. Once all potential participants are entered, the rfp software confirms that each participant meets the life expectancy requirement 114. Any potential participants who do not meet the requirements are removed from the pool and stored to be made available to another pool of potential participants. All remaining records become participants in the pool database. The pool database maintains complete records of each participant investor while maintaining complete anonymity among the participants.

Next, the rfp software authorizes the funds 116 in each participant's bank account electronically using the bank information already on file. If the full amounts of a participant's funds are not able to be successfully authorized, the rfp software generates a tracked email to be transmitted to the affected participant. The rfp software also notifies the pool administrator of the lack of available funds and whether the email sent has been opened. The rfp software designates all participants who funds are successfully authorized as active participants 118.

An investment partnership that has a fixed time period of years is then formed and a partnership bank account is opened by the pool administrator 120. The partnership bank account routing number and account number are then entered into the rfp software. In addition, rfp program initiates the purchase of a term life insurance policy on behalf of each active participant 122. The rfp software then completes the electronic withdrawal of funds from each active participant's bank account and electronically deposits the funds into the partnership bank account 124. These funds are used to make the life insurance premium payments for the policies taken out in step 124 and to fund an investment portfolio 126.

Whenever an active participant dies, the pool administrator enters in step 128 a date of death for the participant into the rfp software, which prompts the rfp software to request for the life insurance benefits to be electronically transferred to the investment partnership bank account on the corresponding life insurance policy. If this is not able to be done electronically, the rfp software instructs the pool administrator to do so. Once the life insurance proceeds are received, the rfp software electronically transfers the full amount, which equals the investor's initial investment, to the investor bank account 130 and removes the active status on the participant's database 134. In addition, for redundancy the rfp software always checks for an entry in the date of death field before issuing payments of dividend interest to active participants' bank accounts 132.

As shown in element 136, the portfolio revenues are periodically moved into the partnership bank account. When this happens, the rfp software electronically transfers the interest or return on the portfolio funds pro rata into the bank account of all the active participants 138.

As shown in element 140 in FIG. 4, at the termination of the investment partnership program at the end of the fixed period of time such as twenty-five years, the rfp software electronically prompts the investment portfolio to liquidate all the assets that remain in the portfolio and electronically transfer the proceeds into the partnership bank account 142. If this cannot be done electronically, the pool administrator must initiate the liquidation and transfer. From the partnership bank account, the rfp software transfers the entire sum pro rata into the bank accounts of all the active participants 142.

This computer managed retirement fund program is capable of providing similar but different embodiments of the subject retirement fund program in operation for retired persons and generating the increasing revenue stream.

Note, however, when the investment partnership time expires for the pre-set fixed period such as twenty-five years or thirty years, the investment partnership will always enter dissolution and the portfolio must be liquidated. In one scenario, each of the original participant investors, if alive, or if deceased their estate, will receive the pro rata share of the investment money left in the investment partnership. Thus, everyone in the initial pool that started in the investment partnership or that person's estate or assignees would then receive back the initial investment and any additional revenues generated by the portfolio at the time it is terminated. If the portfolio fund program includes term life insurance on each participant, at the end of the investment partnership the remaining living participants will divide the remaining funds pro rata. The deceased participants estates will receive the term insurance benefits.

One of the important features of the retirement fund program is the creation of a portfolio which in the best mode of the invention is set up with one of the many financial return engines.

The portfolio maintained by the investment partnership can be comprised of numerous different types of financial instruments to generate revenue for payment of a revenue stream to the investor participants annually. Thus, the investment portfolio could include mutual funds, bonds, stocks, options, tracker, EFTs, notes, mortgages, REITS, real estate, commodities, Treasuries or other types of similar investments now available or conceived in the future. The underlying assets could also include taxable and tax free municipal bonds or similar instruments. In addition to the numerous different types of financial instruments that are available for use in the portfolio to generate revenue for payment of a revenue stream to the investor participants that are typically selected in the United States, foreign financial instruments may also be utilized. For example, the British Government has a financial instrument termed "Commonwealth Shares." This foreign instrument could be used in the portfolio for generating revenue over the fixed time period. Other quality foreign financial instruments may also be used. It would be up to the managers of the investment partnership to select specifically the high quality debt securities or whatever financial instruments are placed inside the portfolio to generate revenue over the fixed time period of the investment partnership for payment back to the investor participants.

The computer managed retirement fund program described herein and the method of providing it clearly establishes a fund that can greatly benefit those individuals that continue to live in a equitable manner and ensure that the person will not run out of money even as octogenarians survive into their nineties because the revenue stream from the retirement fund program would be increasing yearly as some of the other participants become deceased.

As previously mentioned, the retirement fund and method described herein is implemented within a computer or a data processing system and may be embodied in a software program or the like. The term "computer" includes every type of computing device including, without limitation, a desktop computer, a laptop computer, a handheld computer, a personal digital assistant (PDA), and the like. The system and method of the present invention may be embodied in a computer software program that is embodied within a computer readable medium and that is operable and executable by a processor unit within a computer.

The instant invention that has been shown and described herein is considered to be the most practical and preferred embodiment. It is recognized, however, that departures may be made therefrom within the scope of the invention and that obvious modifications will occur to a person skilled in the art.

What is claimed is:

1. A system for managing and administrating a retirement fund program comprising:

a computer having a processor unit, wherein said processor is configured to execute the following steps;

populating an investor database that is defined by a listing of a plurality of participating investors selected to partake in the retirement fund program, wherein a fixed number of participants in the retirement fund program, an investment amount to be contributed by each participating investor, and at least one termination event defining when the retirement fund program will cease active operation have previously been designated;

wherein the participating investors are listed in the database, the number of participating investors is equal to the previously determined fixed number of participants, the identities of participating investors are inaccessible to the participating investors, and each participating investor has a substantially identical remaining life expectancy, actuarially, and makes a retirement financial contribution which is a monetary financial contribution equal to the previously set investment amount to the retirement fund program;

wherein the retirement financial contributions are pooled, a portfolio with funds from the pooled retirement financial contributions is funded, and acquisition and management of portfolio assets is facilitated through the portfolio;

wherein one fund term life insurance policy insuring the life of one participating investor is selectively provided to each participating investors who does not decline said fund term life insurance policy;

designating any participating investor who dies prior to the occurrence of the termination event as inactive in said database, wherein for any participating investor provided a fund term life insurance policy, an amount up to the value of said fund term life insurance policy is returned to a designee of the designated inactive participating investor upon that participating investor being designated as inactive in the database prior to the occurrence of the termination event;

wherein revenue generated by said portfolio prior to the occurrence of the termination event is proportionally distributed, at a periodic and reoccurring interval, to every participating investor that has not been designated as inactive in the database; and wherein portfolio assets are liquidated upon the occurrence of the termination event and liquidated portfolio assets are proportionally distributed to each participating investor that has not been designated as inactive in the database.

2. The system of claim 1, wherein the proportional distribution of revenue begins after a predetermined period of time.

3. The system of claim 1, wherein the proportional distribution of revenue begins after a predetermined amount of revenue is generated by said portfolio.

4. A method for administrating a retirement fund program, said method being implemented through a computing device containing a processor configured to facilitate the operation of said retirement fund program and comprising the steps of:

designating of a fixed number of participants in the retirement fund program, an investment amount to be contributed by a plurality of participating investors, and at least one termination event defining when the retirement fund program will cease active operation;

selecting a plurality of participating investors to partake in the retirement fund program, wherein each participating investor has a substantially identical remaining life expectancy, actuarially, and the number of participating investors is equal to the previously determined fixed number of participants;

populating by said processor an investor database that is defined by a listing of participating investors, wherein each participating investor makes a retirement financial contribution which is a monetary financial contribution equal to the previously set investment amount to the retirement fund program and the identities of participating investors in the database are inaccessible to the participating investors;

pooling the retirement financial contribution from each participating investor; funding by said processor a portfolio with funds from the pooled retirement financial contributions, wherein acquisition and management of portfolio assets is facilitated through the portfolio;

selectively providing one fund term life insurance policy insuring the life of one participating investor for each participating investor who does not decline said fund term life insurance policy is insured;

designating by said processor any participating investor who dies prior to the occurrence of the termination event as inactive in said database;

causing the return to any participating investor provided a fund life insurance policy of an amount up to the value of said fund term life insurance policy to a designee of the designated inactive participating investor upon that participating investor being designated as inactive in the database prior to the occurrence of the termination event;

proportionally distributing, at a periodic and reoccurring interval, revenue generated by said portfolio to every participating investor that has not been designated as inactive in the database;

liquidating by said processor portfolio assets upon the occurrence of the termination event; and proportionally distributing liquidated portfolio assets to each participating investor that has not been designated as inactive in the database.

5. The method of claim 4, wherein the step of proportionally distributing revenue begins after a predetermined period of time.

6. The method of claim 4, wherein the step of proportionally distributing revenue begins after a predetermined amount of revenue is generated by said portfolio.

* * * * *